US012657085B2

(12) United States Patent
Kim et al.

(10) Patent No.: US 12,657,085 B2
(45) Date of Patent: Jun. 16, 2026

(54) METHOD AND APPARATUS FOR MANAGING MEMORY IN MEMORY DISAGGREGATION ENVIRONMENT

(71) Applicants: ELECTRONICS AND TELECOMMUNICATIONS RESEARCH INSTITUTE, Daejeon (KR); AJOU UNIVERSITY INDUSTRY-ACADEMIC COOPERATION FOUNDATION, Suwon-si (KR)

(72) Inventors: Tae-Hoon Kim, Daejeon (KR); Kwang-Won Koh, Daejeon (KR); Chang-Dae Kim, Daejeon (KR); Eun-Ji Pak, Daejeon (KR); Yeon-Jeong Jeong, Daejeon (KR); Sang-Hoon Kim, Suwon-si (KR)

(73) Assignees: ELECTRONICS and TELECOMMUNICATIONS RESEARCH INSTITUTE, Daejeon (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 18/787,138

(22) Filed: Jul. 29, 2024

(65) Prior Publication Data

US 2025/0077340 A1     Mar. 6, 2025

(30) Foreign Application Priority Data

Sep. 5, 2023   (KR) ........................ 10-2023-0117386
Mar. 20, 2024   (KR) ........................ 10-2024-0038643

(51) Int. Cl.
| | |
|---|---|
| *G06F 11/00* | (2006.01) |
| *G06F 3/06* | (2006.01) |
| *G06F 11/07* | (2006.01) |

(52) U.S. Cl.
CPC ........ *G06F 11/0793* (2013.01); *G06F 3/0619* (2013.01); *G06F 3/064* (2013.01); *G06F 3/0673* (2013.01); *G06F 11/073* (2013.01)

(58) Field of Classification Search
CPC .... G06F 11/0793; G06F 3/0619; G06F 3/064; G06F 3/0673; G06F 11/073
See application file for complete search history.

(56) References Cited

U.S. PATENT DOCUMENTS 5,564,011 A * 10/1996 Yammine ............ G06F 11/1435
                                                      714/6.13
6,161,208 A * 12/2000 Dutton ................ G06F 12/0897
                                                      714/E11.037

(Continued)

FOREIGN PATENT DOCUMENTS

KR     10-2016-0097362 A     8/2016
KR         10-2472330 B1     11/2022
KR     10-2023-0001933 A     1/2023

OTHER PUBLICATIONS

Emmanuel Amaro et al., "Can Far Memory Improve Job Throughput? ," Fifteenth European Conference on Computer Systems (EuroSys '20), Apr. 27-30, 2020, 16 pages.

*Primary Examiner* — Jason B Bryan
(74) *Attorney, Agent, or Firm* — Sughrue Mion, PLLC

(57) ABSTRACT

Disclosed herein is a method for managing memory in a memory disaggregation environment. The method includes handling a required subblock within a block more preferentially than an additional block in the event of a page fault (Continued)

and handling a page fault for the block in which the required subblock is preferentially processed.

14 Claims, 7 Drawing Sheets

(56) References Cited

U.S. PATENT DOCUMENTS

| | | | |
|---|---|---|---|
| 8,719,661 B1 * | 5/2014 | Gulati | G06F 11/1415 |
| | | | 714/764 |
| 9,965,441 B2 | 5/2018 | Sajeepa et al. | |
| 2007/0300008 A1 | 12/2007 | Rogers et al. | |
| 2016/0314177 A1 | 10/2016 | Veeraraghavan et al. | |
| 2020/0151118 A1 | 5/2020 | Jeong et al. | |
| 2021/0374080 A1 * | 12/2021 | Horwich | G06F 12/0891 |
| 2023/0153245 A1 | 5/2023 | Jo | |
| 2023/0161708 A1 | 5/2023 | Koh et al. | |

* cited by examiner

1

METHOD AND APPARATUS FOR MANAGING MEMORY IN MEMORY DISAGGREGATION ENVIRONMENT

CROSS REFERENCE TO RELATED APPLICATIONS

This application claims the benefit of Korean Patent Applications No. 10-2023-0117386, filed Sep. 5, 2023, and No. 10-2024-0038643, filed Mar. 20, 2024, which are hereby incorporated by reference in their entireties into this application.

BACKGROUND OF THE INVENTION

1. Technical Field

The present disclosure relates to technology for effectively communicating with remote memory in a memory disaggregation environment.

More particularly, the present disclosure relates to technology for increasing a communication I/O unit while prioritizing required data during communication with remote memory.

2. Description of the Related Art

A disaggregated memory system is technology that aims to efficiently utilize resources by sharing memory resources of different computers, and it may provide large amounts of memory by utilizing not only the memory of a host on which a virtual machine of a user operates but also remote memory of other nodes.

In the disaggregated memory system, performance of remote memory access influences the performance of the entire system. This is because a corresponding process must wait until a required page is prepared in the local memory of a host. This is mainly handled based on a page fault. When a page required by a process is not present in local memory, a page fault occurs, and only after the required page is fetched from remote memory to the local memory and mapped in the disaggregated memory system is page-fault handling completed, and the process resumes operation. Therefore, when a virtual machine requires large amounts of memory and frequently accesses remote memory, significant latency is incurred. With advancement of network technology, technology such as Remote Direct Memory Access (RDMA) can be used, and high-speed interconnect hardware continues to be developed, but access to remote memory still takes considerable time compared to access to local memory of a host.

In order to improve performance of such remote memory access, conventional technologies have introduced a prefetch technique. This is a technique of fetching data required by a virtual machine to host memory in advance, and the more the prefetched data, the higher the opportunity to reduce access to the remote memory. Here, if the prediction is successful, access to the remote memory may be reduced, but if the prediction fails, additional access to the remote memory is required, which may increase latency and consumption of network bandwidth. Furthermore, required data and prefetch data are usually transferred together, in which case the required data may be delayed due to the prefetch data.

DOCUMENTS OF RELATED ART (Patent Document 1) Korean Patent No. 2472330, titled "Method of operating distributed memory system for context-based prefetch and memory system performing the same".

SUMMARY OF THE INVENTION

An object of the present disclosure is to improve performance of communication with remote memory in a memory disaggregation environment.

Another object of the present disclosure is to reduce latency incurred due to communication with remote memory by prioritizing a required subblock.

A further object of the present disclosure is to reduce latency incurred due to communication with remote memory by prioritizing a required page.

In order to accomplish the above objects, a method for managing memory in a memory disaggregation environment according to an embodiment of the present disclosure includes, when a page fault occurs, handling a required subblock within a block more preferentially than an additional subblock; and handling a page fault for the block in which the required subblock is preferentially handled.

Here, the subblock may be configured with a plurality of contiguous memory pages.

Here, handling the required subblock within the block more preferentially than the additional subblock may comprise inserting the required subblock into a first queue and inserting the additional subblock into a second queue.

Here, handling the required subblock within the block more preferentially than the additional subblock may comprise setting a subblock priority flag on the block after handling input/output of the required subblock.

Here, handling the page fault for the block in which the required subblock is preferentially handled may comprise checking whether the subblock priority flag is set on the block in which the required subblock is preferentially handled.

Here, handling the page fault for the block in which the required subblock is preferentially handled may comprise, when the subblock priority flag is set, handling the subblock within the block and releasing the subblock priority flag.

Here, handling the required subblock within the block more preferentially than the additional subblock may comprise handling a required page within the required subblock and performing address space mapping.

Here, handling the required subblock within the block more preferentially than the additional subblock may comprise performing a signature at the last word address of the required page and checking whether the required page is handled using the value of the signature of the last word address.

Also, in order to accomplish the above objects, an apparatus for managing memory in a memory disaggregation environment according to an embodiment of the present disclosure includes a memory management unit for controlling input/output of remote memory and local memory and a communication unit for performing communication with the remote memory. When a page fault occurs, the memory management unit handles a required subblock within a block more preferentially than an additional subblock and handles a page fault for the block in which the required subblock is preferentially handled.

Here, the subblock may be configured with a plurality of contiguous memory pages.

Here, the memory management unit may insert the required subblock into a first queue and insert the additional subblock into a second queue.

Here, the memory management unit may set a subblock priority flag on the block after handling input/output of the required subblock.

Here, the memory management unit may check whether the subblock priority flag is set on the block in which the required subblock is preferentially handled.

Here, when the subblock priority flag is set, the memory management unit may handle the subblock within the block and release the subblock priority flag.

Here, the memory management unit may handle a required page within the required subblock and perform address space mapping.

Here, the memory management unit may perform a signature at the last word address of the required page and check whether the required page is handled using the value of the signature of the last word address.

BRIEF DESCRIPTION OF THE DRAWINGS

The above and other objects, features, and advantages of the present disclosure will be more clearly understood from the following detailed description taken in conjunction with the accompanying drawings, in which.

Figures 1, 2:
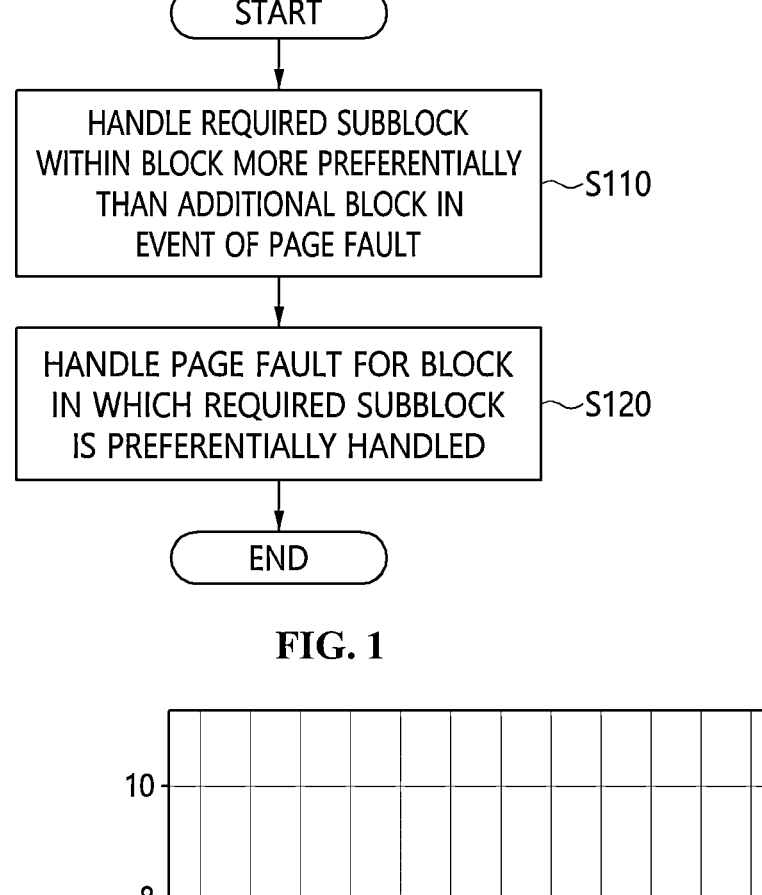
FIG. 1 is a flowchart illustrating a method for managing memory in a memory disaggregation environment according to an embodiment of the present disclosure.
FIG. 2 is a graph illustrating average read latency depending on an I/O transfer size.

DESCRIPTION OF THE PREFERRED
EMBODIMENTS

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

In the present specification, each of expressions such as "A or B", "at least one of A and B", "at least one of A or B", "A, B, or C", "at least one of A, B, and C", and "at least one of A, B, or C" may include any one of the items listed in the expression or all possible combinations thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

FIG. 1 is a flowchart illustrating a method for managing memory in a memory disaggregation environment according to an embodiment of the present disclosure.

The method for managing memory in a memory disaggregation environment according to an embodiment of the present disclosure may be performed by a memory management apparatus, such as a computing device.

Referring to FIG. 1, the method for managing memory in a memory disaggregation environment according to an embodiment of the present disclosure includes, when a page fault occurs, handling a required subblock within a block more preferentially than an additional subblock at step S110 and handling a page fault for the block in which the required subblock is preferentially handled at step S120.

Here, the subblock may be configured with a plurality of contiguous memory pages.

Here, handling the required subblock within the block more preferentially than the additional subblock at step S110 may comprise inserting the required subblock into a first queue and inserting the additional subblock into a second queue.

Here, handling the required subblock within the block more preferentially than the additional subblock at step S110 may comprise setting a subblock priority flag on the block after input/output (I/O) of the required subblock is handled.

Here, handling the page fault for the block in which the required subblock is preferentially handled at step S120 may comprise checking whether the priority flag is set on the block in which the required subblock is preferentially handled.

Here, handling the page fault for the block in which the required subblock is preferentially handled at step S120 may comprise, when the subblock priority flag is set, handling the subblock within the block and releasing the subblock priority flag.

Here, handling the required subblock within the block more preferentially than the additional subblock at step S110 may comprise handling a required page within the required subblock and performing address space mapping.

Here, handling the required subblock within the block more preferentially than the additional subblock at step S110 may comprise performing a signature at the last word address of the required page and checking whether the required page is handled using the value of the signature of the last word address.

The present disclosure relates to technology for improving performance of communication with remote memory in a memory disaggregation environment.

A prefetch technique may be used in order to reduce the number of accesses to remote memory in a memory disaggregation environment. Because a page predicted to be needed later is brought in advance along with a required page, the prefetch technique has an advantage in that, if the prediction is successful, there is no need to perform remote memory access when the page is accessed later. In the case of prefetch, the greater the number of fetched pages, the higher the possibility of success in prediction. Therefore, it is necessary to fetch a large number of pages.

However, the data transfer time increases due to the prefetch pages, and fetching the actually required page may be delayed. Also, when prediction fails, because fetching unnecessary pages may result in consumption of bandwidth and a waste of local memory, prefetching is far from being effective, or may degrade performance.

The present disclosure may improve performance of communication with remote memory in a memory disaggregation environment through a method of quickly handling an actually required page while quickly fetching a large number of pages.

First, a method of increasing a unit of I/O and thereby quickly fetching a large number of pages may be used according to an embodiment of the present disclosure. At the existing OS level, a disaggregated memory system generally performs I/O in units of pages (4 KiB). This is because it is easy to manage I/O in units of pages at the OS level. However, when the size of a unit of I/O transfer is increased greater than a page size, the total amount of time taken to fetch data is reduced.

FIG. 2 is a graph illustrating average read latency depending on an I/O transfer size.

FIG. 2 is a result of measuring latency depending on the size of data transferred through RDMA, and a tool called InfiniBand read latency (ib_read_lat) of Perftest is used for the measurement. For example, it may be assumed that a total of 128 KiB of data, including a required page and prefetch data, is fetched. Here, if I/O is performed in an existing 4 KiB page unit, 32 DMA transfers have to be performed, and because 3 μsec are taken to perform each DMA transfer, it may take a total of 96 μsec to perform the I/O. However, if data is fetched in units of 32 KiB, because 4 DMA transfers, each taking 4.7 μsec., are performed, it takes 18.8 μsec to perform the I/O, and the difference in latency is about five times. Therefore, when a large amount of data is prefetched, performance is further improved with an increase in a unit of I/O.

In order to manage pages and perform I/O in a greater unit using spatial locality, a unit called a subblock is used in the present disclosure.

Figure 3:
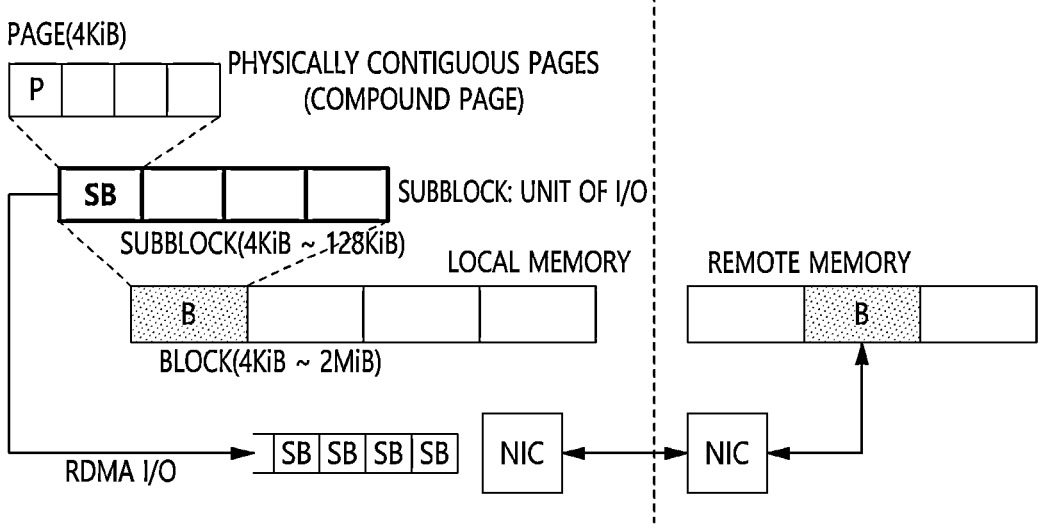
FIG. 3 illustrates a method for allocating and managing a subblock and using the same for I/O.

FIG. 3 illustrates a method of allocating and managing a subblock and using the same for I/O.

Referring to FIG. 3, in the method according to an embodiment of the present disclosure, a plurality of physically contiguous pages (a compound page) is allocated as a single subblock, and a disaggregated memory system may be managed in units of subblocks. Here, a single I/O transfer may be performed in a subblock unit. Multiple subblocks constitute a single block, and this block indicates a data block having a large size in which spatial locality is taken into consideration. Accordingly, assuming a 32 KiB subblock, when a 256 KiB block is sent and received through RDMA, communication may be performed through 8 RDMA transfers.

Also, subblocks may facilitate memory management, in which case memory may be managed in a greater unit by managing additional information of a head page of a compound page based on the compound page technology of a Linux kernel, rather than individually managing all of the pages.

The use of the method of accessing remote memory in units of subblocks may result in performance improvement when prefetch data having a large size and required data are fetched. However, when handling the required data is delayed due to handling of the prefetch data or when the required data needs to be handled along with the prefetch data, performance cannot be improved. In order to address this issue, the present disclosure proposes Critical Subblock First (CSF) and Critical Page First (CPF) techniques, which prioritize required data while considering spatial locality by performing prefetching in a greater unit.

Even though memory management and I/O handling are performed in units of subblocks, when a page fault for a required page is synchronously handled in a unit of a single large block in the system, the page fault is not handled until all of the prefetch subblocks and the required subblock are fetched, so handling the required subblock is delayed.

When the CSF scheme is used, the I/O for the required subblock is inserted first into an I/O queue for only required subblocks, after which the subblocks for prefetch are inserted into an I/O queue for prefetch subblocks. Accordingly, a situation in which the required data is delayed due to prefetching may be prevented. Also, when the I/O of the required subblock is finished, the page fault for the corresponding required page can be handled. Therefore, the page fault may be asynchronously handled even though the I/O of the prefetch data is not finished, after which the I/O of the prefetch subblocks may be handled. Accordingly, the situation in which handling the required data is delayed due to prefetching may be prevented.

Figure 4:
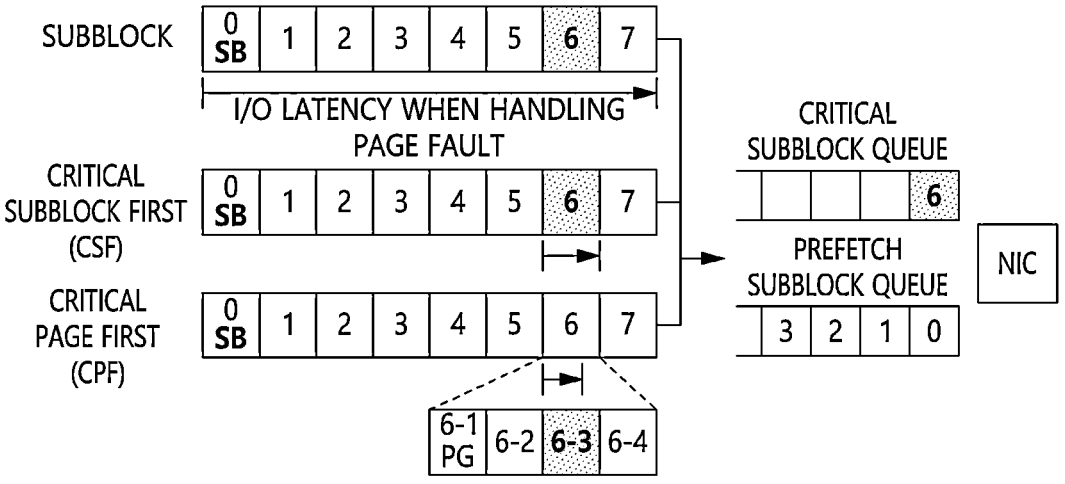
FIG. 4 conceptually illustrates latency when a Critical Subblock First (CSF) method and a Critical Page First (CPF) method are used.

FIG. 4 conceptually illustrates latency when a Critical Block First (CSF) method and a Critical Page First (CPF) method are used.

Specifically, FIG. 4 is a view for explaining an I/O time improvement effect when a page fault is handled using the CSF and CPF methods. When existing subblock-based management is performed, the time taken to fetch an entire block to local memory is reduced, but the time taken to handle a page fault is affected by the time taken to handle the I/O of a large amount of prefetch data.

However, when the Critical Subblock First (CSF) method is used, the I/O of a required subblock is issued first, and then prefetch subblocks are issued to another queue. Accordingly, the I/O of the required subblock is not affected by the prefetch data, and the time taken to handle a page fault is significantly reduced, because the page fault can be handled immediately after the I/O of the required subblock is completed. In FIG. 4, an environment in which the size of a block is 128 KiB and the size of a subblock is 16 KiB is assumed. Here, if subblock '6' is a required subblock in a block, when handling the subblock '6' is finished, mapping of a required page within the required subblock can be completed, and the page fault may be handled.

Figure 5:
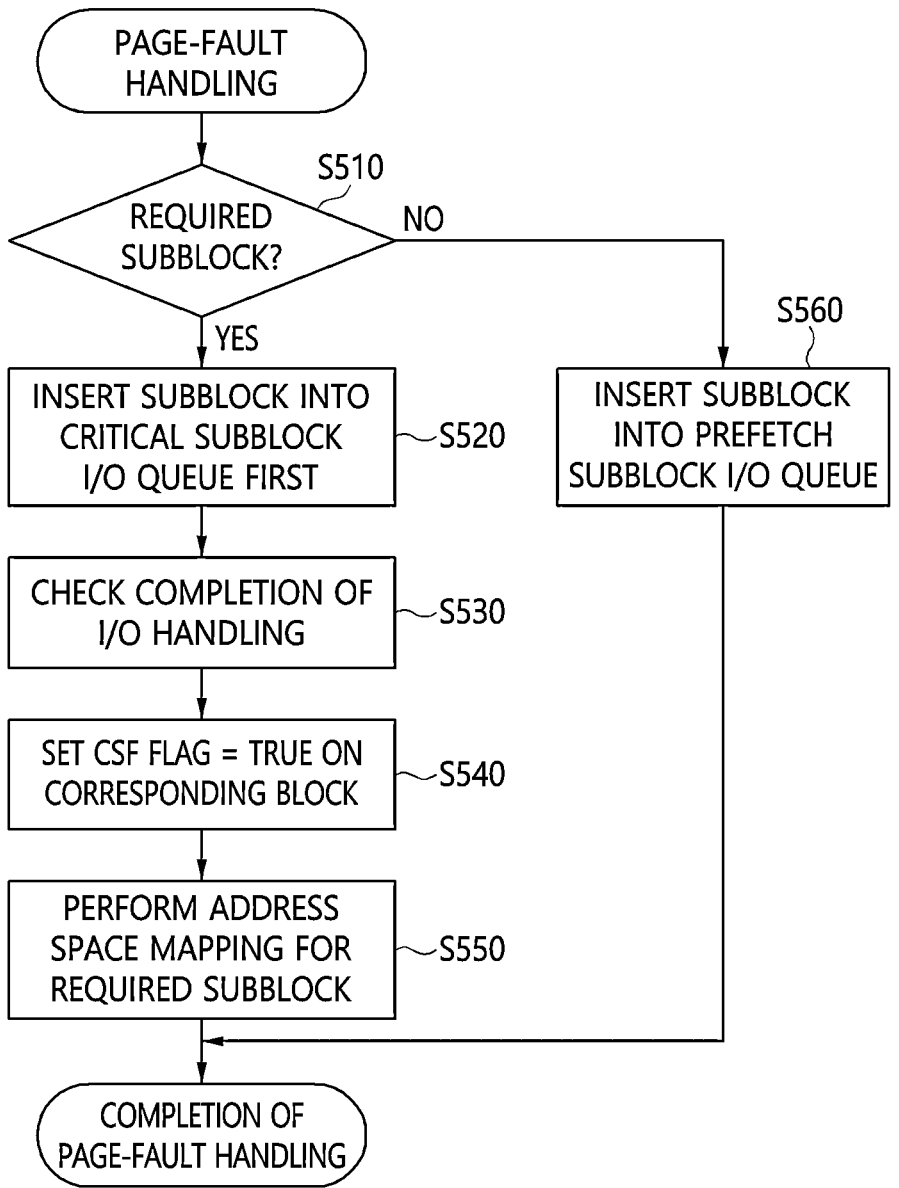
FIG. 5 is a flowchart illustrating a process of handling a page fault in a method according to an embodiment of the present disclosure.

FIG. 5 is a flowchart illustrating a process of handling a page fault in a method according to an embodiment of the present disclosure.

Figure 6:
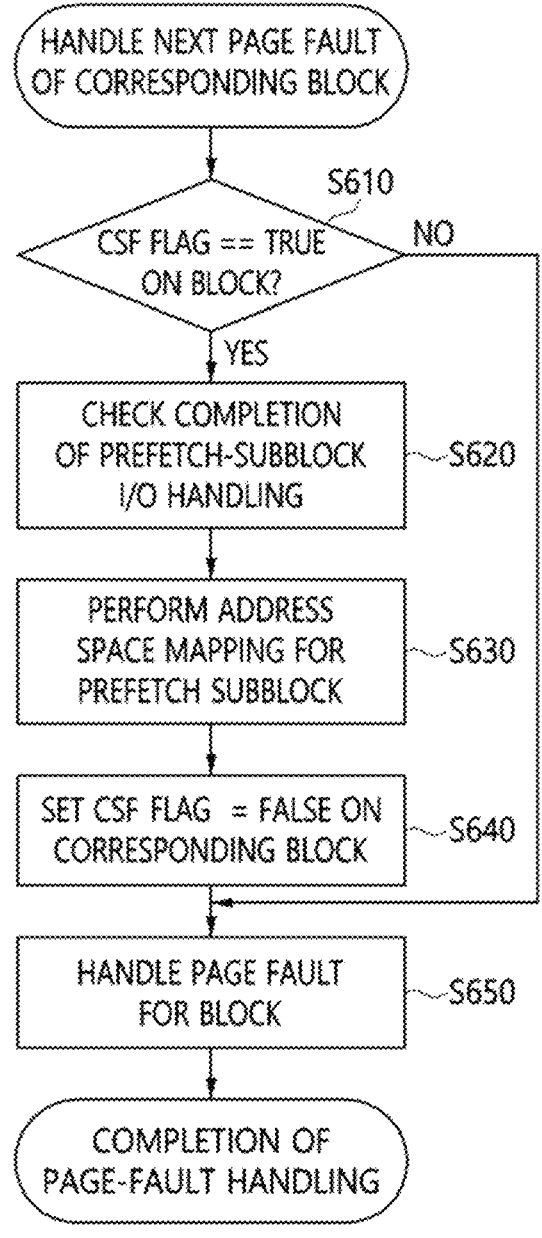
FIG. 6 is a flowchart illustrating a process of handling a page fault for a block when a subblock therein is preferentially handled in a method according to an embodiment of the present disclosure.

FIG. 6 is a flowchart illustrating a process of handling a page fault for a block when a subblock therein is preferentially handled in a method according to an embodiment of the present disclosure.

Referring to FIG. 5, when a page fault occurs, whether a subblock is a required subblock is determined at step S510, and when the subblock is the required subblock, the required subblock is inserted into a critical subblock I/O queue at step S520. After it is checked that handling the I/O of the required subblock is completed at step S530, a CSF flag of a block including the required subblock is set to true at step S540. Subsequently, address space mapping for the required subblock is performed at step S550. When the subblock is not a required subblock but a general subblock, the subblock is inserted into a prefetch subblock I/O queue at step S560.

The I/O of the prefetch subblock, which is asynchronously handled in the event of a page fault, is processed in the background, and when a page fault occurs due to the following access to the corresponding block, whether corresponding block is the block in which the required subblock is preferentially handled is checked at step S610, and when the corresponding block is the block in which the required subblock is preferentially handled, the I/O handling for the corresponding prefetch subblock is checked at step S620, mapping is performed at step S630, the CSF flag of the corresponding block is set to false at step S640, and the page fault for the corresponding block is handled at step S650.

When the block including the prefetch subblocks is evicted to the remote memory or the mapping is disconnected even though the I/O of the prefetch subblocks is not yet finished, the corresponding task is performed after all the I/O is handled.

The CSF method is helpful in fetching a required subblock including a required page and accelerating page-fault handling, but causes overhead, compared to the cost of performing page-fault handling by fetching only the actually required page. In order to address this issue, the present disclosure proposes a Critical Page First (CPF) method for further accelerating page-fault handling while exploiting spatial locality.

Figure 7:
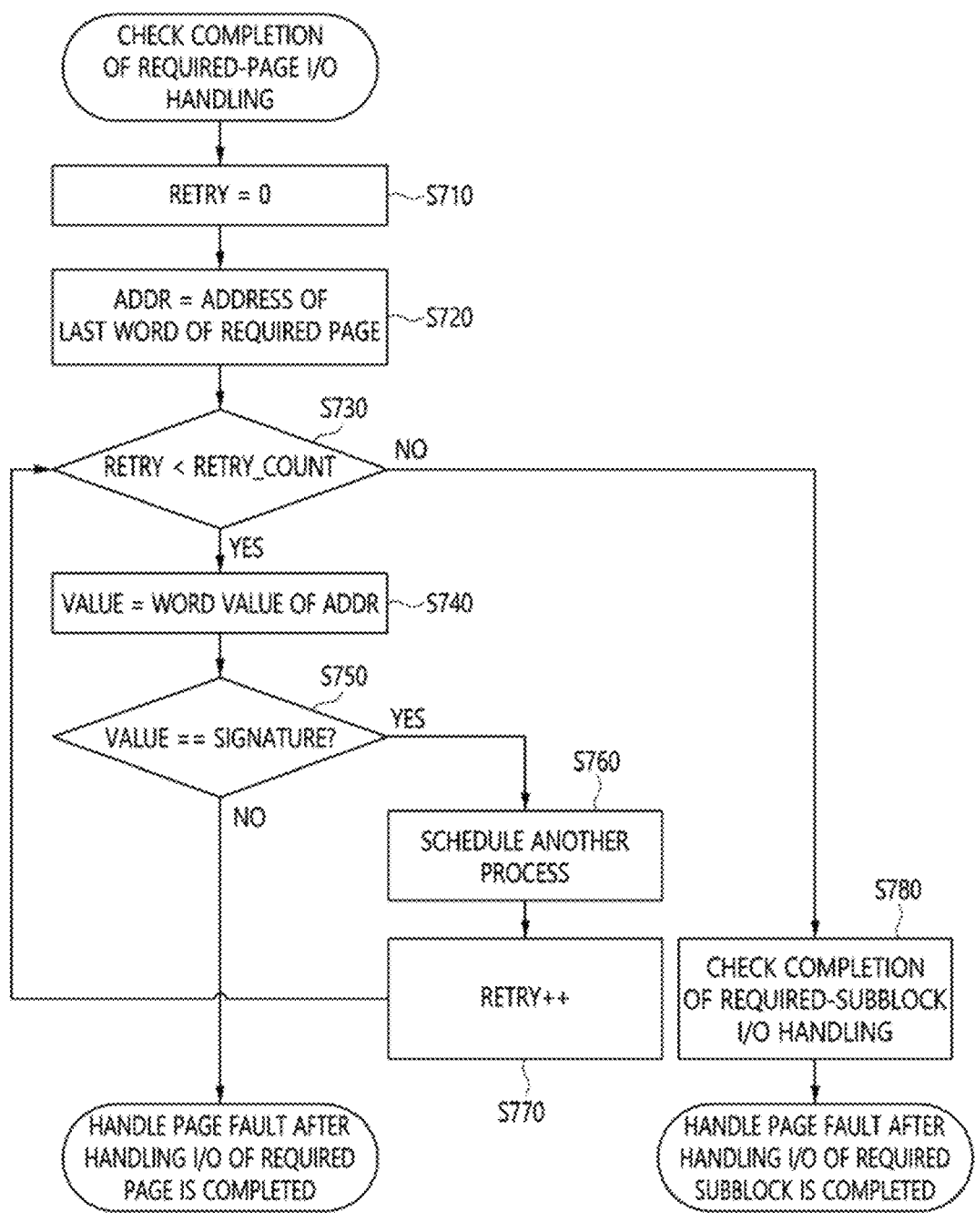
FIG. 7 is a flowchart illustrating a Critical Page First (CPF) method in a method according to an embodiment of the present disclosure.

FIG. 7 is a flowchart illustrating a Critical Page First (CPF) method in a method according to an embodiment of the present disclosure.

When data communication between a host and remote memory is performed, RDMA technology is usually used. When I/O is performed through DMA using a trusted protocol, data is transferred in order from a low address space to a high address space. Accordingly, if the last word of I/O data is changed after an I/O read request, this indicates that the data is transferred. Using this technique, the present disclosure checks whether the I/O of a required page in a corresponding subblock is completed while performing I/O in a unit of a large subblock in the memory disaggregation environment.

Referring to FIG. 7, in order to check completion of page I/O handling, a specific signature is put on the last word of a required page before processing an I/O read request at step S720, and after the I/O request, checking is performed until the last word of the required page is not the specific signature, whereby completion of the transfer of the required page may be confirmed at steps S740 and S750. Even if the signature value and the value of the actual data match each other with a very small probability, handling the I/O request may be performed using the I/O request handling method of the existing CSF method.

After handling the I/O of the required page is completed, the page fault is handled in a manner similar to page-fault handling performed after handling the I/O of the required subblock is completed in FIG. 6. However, after handling the page fault is completed by mapping only the required page, when a following page fault for the corresponding block occurs, I/O handling and mapping are performed for all of the pages, rather than only the required page, and the page fault for the block may be handled.

Figure 8:
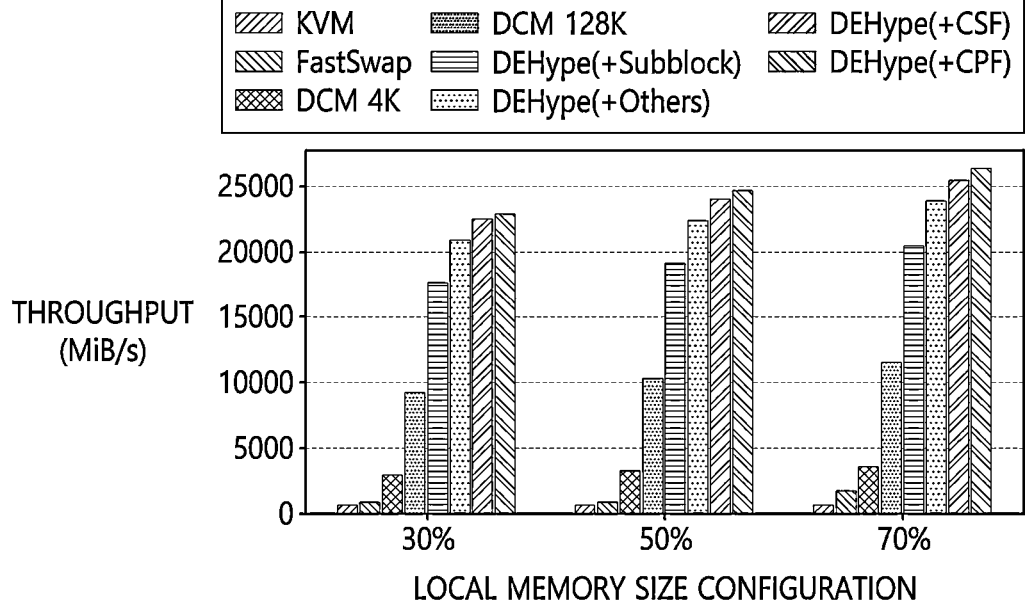
FIG. 8 is a graph illustrating a communication performance improvement effect of a method according to an embodiment of the present disclosure.

FIG. 8 is a graph illustrating a communication performance improvement effect of a method according to an embodiment of the present disclosure.

The graph of FIG. 8 illustrates throughput when the STREAM benchmark is performed, and shows a result of comparison with KVM/QEMU-based virtualization technology (KVM), FastSwap, and DCM. DCM is divided into DCM 4 K using a 4 KiB block and DCM 128 K using a 128 KiB block. DEHype, which is technology proposed by the present disclosure, uses a 128 KiB block and a 32 KiB subblock. Performance measured when a subblock configuration (+Subblock), a Critical Subblock First (+CSF) method, and a Critical Page First (+CPF) method are applied is illustrated. The x-axis represents the results acquired when the amount of local memory of a host is set to 30%, 50%, and 70% of the total amount of memory used by the benchmark in the memory disaggregation environment.

It can be seen that application of subblocks proposed by the present disclosure results in 91.5% performance improvement, compared to DCM 128 K in the environment in which the amount of the local memory is set to 30% of the total amount of memory. Here, DMA overhead is reduced by increasing the size of an I/O unit, and memory is managed in a unit greater than a page, whereby performance improvement is obtained. Also, a page fault for a required subblock/page is quickly handled using the CSF method and the CPF method, whereby 9.1% performance improvement is obtained, compared to when CSF/CPF methods are not applied, in the environment in which the amount of the local memory is set to 30% of the total amount of memory.

Accordingly, the present disclosure designs a method for quickly handling a page fault while obtaining prefetching effects for fetching a large amount of data by exploiting spatial locality, thereby further improving performance compared to the conventional technologies.

Figure 9:
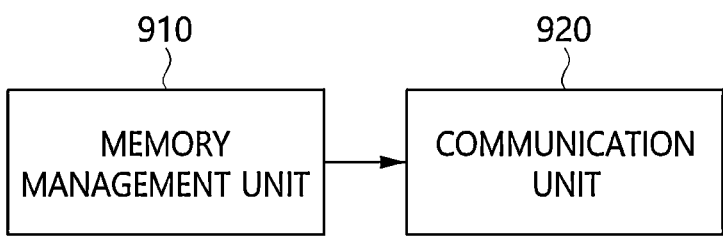
FIG. 9 is a block diagram illustrating an apparatus for managing memory in a memory disaggregation environment according to an embodiment of the present disclosure.

FIG. 9 is a block diagram illustrating an apparatus for managing memory in a memory disaggregation environment according to an embodiment of the present disclosure.

Referring to FIG. 9, the apparatus for managing memory in a memory disaggregation environment according to an embodiment of the present disclosure includes a memory management unit 910 for controlling I/O of remote memory and local memory and a communication unit 920 for performing communication with the remote memory. The memory management unit 910 handles a required subblock within a block more preferentially than an additional sub-block when a page fault occurs, and then handles a page fault for the block in which the required subblock is preferentially handled.

Here, the subblock may be configured with a plurality of contiguous memory pages.

Here, the memory management unit 910 may insert the required subblock into a first queue and insert the additional subblock into a second queue.

Here, the memory management unit 910 may set a sub-block priority flag on the block after handling the I/O of the required subblock.

Here, the memory management unit 910 may check whether the subblock priority flag is set on the block in which the required subblock is preferentially handled.

Here, when the subblock priority flag is set, the memory management unit 910 may handle the subblock within the block and release the subblock priority flag.

Here, the memory management unit 910 may handle a required page within the required subblock and perform address space mapping.

Here, the memory management unit 910 may perform a signature at the last word address of the required page and check whether the required page is handled using the value of the signature of the last word address.

Figure 10:
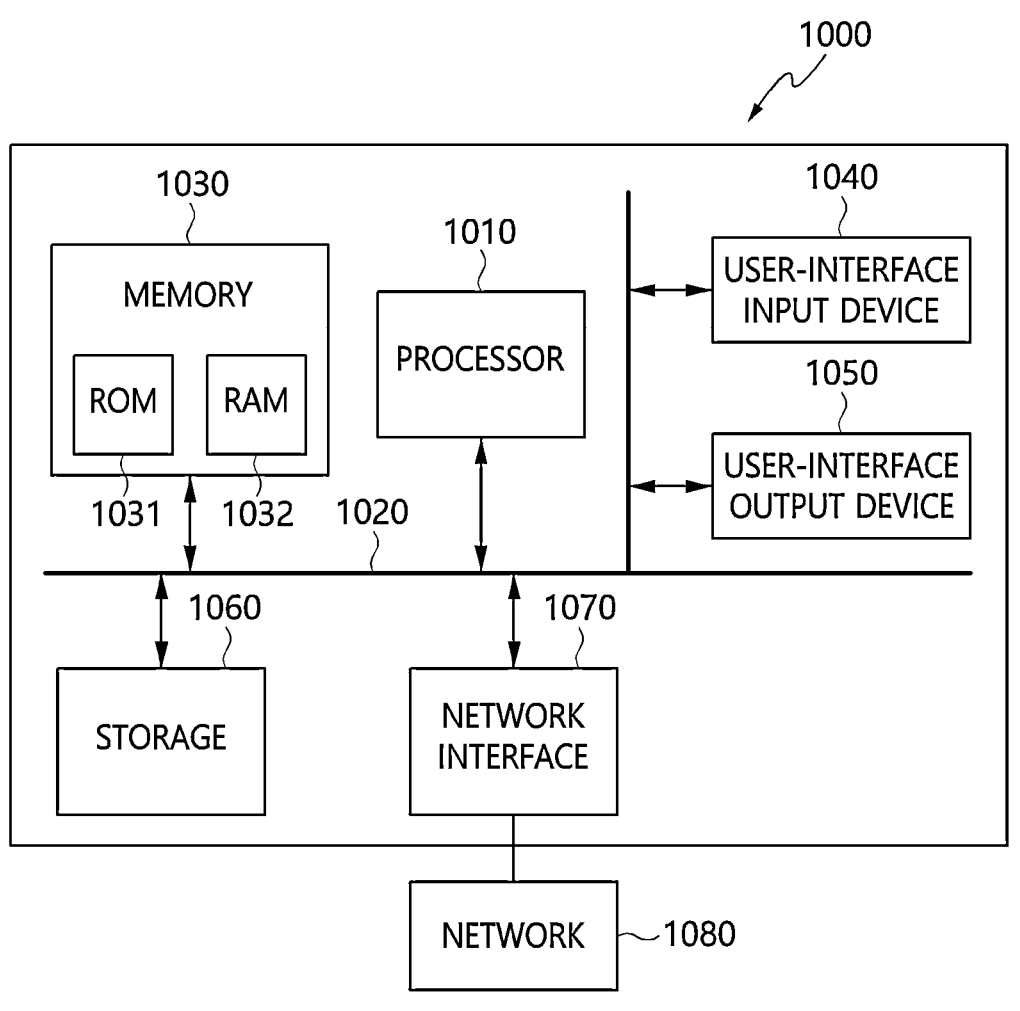
FIG. 10 is a view illustrating the configuration of a computer system according to an embodiment.

FIG. 10 is a view illustrating the configuration of a computer system according to an embodiment.

The apparatus for managing memory in a memory disaggregation environment according to an embodiment may be implemented in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to the present disclosure, performance of communication with remote memory may be improved in a memory disaggregation environment.

Also, the present disclosure may reduce latency incurred due to communication with remote memory by prioritizing a required subblock.

Also, the present disclosure may reduce latency incurred due to communication with remote memory by prioritizing a required page.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for managing memory in a memory disaggregation environment in which memory input/output is performed in a unit of a subblock configured with a plurality of pages, comprising:

when a page fault occurs, handling a required subblock within a block with a higher priority than an additional subblock; and handling a page fault for the block in which the required subblock is handled with the higher priority, wherein the handling of the required subblock comprises setting a subblock priority flag on the block after handling input/output of the required subblock.

2. The method of claim 1, wherein the subblock is configured with a plurality of contiguous memory pages.

3. The method of claim 1, wherein handling the required subblock within the block with the higher priority than the additional subblock comprises inserting the required subblock into a first queue and inserting the additional subblock into a second queue.

4. The method of claim 3, wherein handling the page fault for the block in which the required subblock is handled with the higher priority comprises checking whether the subblock priority flag is set on the block in which the required subblock is handled with the higher priority.

5. The method of claim 4, wherein handling the page fault for the block in which the required subblock is handled with the higher priority comprises, when the subblock priority flag is set, handling the subblock within the block and releasing the subblock priority flag.

6. The method of claim 3, wherein handling the required subblock within the block with the higher priority than the additional subblock comprises handling a required page within the required subblock and performing address space mapping.

7. The method of claim 6, wherein handling the required subblock within the block with the higher priority than the additional subblock comprises performing a signature at a last word address of the required page and checking whether the required page is handled using a value of the signature of the last word address.

8. An apparatus for managing memory in a memory disaggregation environment in which memory input/output is performed in a unit of a subblock configured with a plurality of pages, comprising:

a memory storing one or more instructions; and at least one processor configured to execute the one or more instructions to: control input/output of remote memory and local memory; and when a page fault occurs, handle a required subblock within a block with a higher priority than an additional subblock and handle a page fault for the block in which the required subblock is handled with the higher priority, and set a subblock priority flag on the block after handling input/output of the required subblock.

9. The apparatus of claim 8, wherein the subblock is configured with a plurality of contiguous memory pages.

10. The apparatus of claim 8, wherein the at least one processor is further configured to execute the one or more instructions to:

insert the required subblock into a first queue and insert the additional subblock into a second queue.

11. The apparatus of claim 10, wherein the at least one processor is further configured to execute the one or more instructions to:

check whether the subblock priority flag is set on the block in which the required subblock is handled with the higher priority.

12. The apparatus of claim 11, wherein the at least one processor is further configured to execute the one or more instructions to:

when the subblock priority flag is set, handle the subblock within the block and releases the subblock priority flag.

13. The apparatus of claim 10, wherein the at least one processor is further configured to execute the one or more instructions to:

handle a required page within the required subblock and performs address space mapping.

14. The apparatus of claim 13, wherein the at least one processor is further configured to execute the one or more instructions to:

perform a signature at a last word address of the required page and checks whether the required page is handled using a value of the signature of the last word address.

\* \* \* \* \*